US006960122B2

(12) United States Patent
Lin

(10) Patent No.: US 6,960,122 B2
(45) Date of Patent: Nov. 1, 2005

(54) OPTICAL DISC REPAIRING DEVICE

(76) Inventor: Mao-Sang Lin, No. 14, Lane 44, Chih-Feng St., Taipei (TW)

( * ) Notice: Subject to any disclaimer, the term of this patent is extended or adjusted under 35 U.S.C. 154(b) by 128 days.

(21) Appl. No.: 10/600,354

(22) Filed: Jun. 23, 2003

(65) Prior Publication Data

US 2004/0255412 A1 Dec. 23, 2004

(51) Int. Cl.⁷ .................................................. B24B 1/00
(52) U.S. Cl. ........................ 451/285; 451/287; 451/288; 451/324
(58) Field of Search .................................. 451/6, 10, 11, 451/41, 63, 285, 287, 288, 324

(56) References Cited

U.S. PATENT DOCUMENTS

| | | | | |
|---|---|---|---|---|
| 5,102,099 A | * | 4/1992 | Brown et al. ............... | 451/283 |
| 5,571,041 A | * | 11/1996 | Leikam ....................... | 451/37 |
| 6,099,388 A | * | 8/2000 | Fritsch et al. ................ | 451/28 |
| 6,386,946 B1 | * | 5/2002 | Lin et al. ...................... | 451/7 |
| 6,547,657 B2 | * | 4/2003 | Bauer .......................... | 451/538 |
| 6,595,835 B2 | * | 7/2003 | Gadbois ....................... | 451/66 |
| 6,638,149 B2 | * | 10/2003 | Lalli et al. .................... | 451/63 |
| 6,699,110 B2 | * | 3/2004 | Lee ............................. | 451/242 |
| 6,726,527 B2 | * | 4/2004 | Lalli et al. .................... | 451/5 |

\* cited by examiner

*Primary Examiner*—Eileen P. Morgan
(74) *Attorney, Agent, or Firm*—Birch, Stewart, Kolasch & Birch, LLP

(57) ABSTRACT

An optical disc repairing device is mounted on a repairing machine base to perform cleaning, maintenance and repair of the optical disc. The repairing device includes a movement transmitting element, a connecting element mounted on the movement transmitting element, a resilient piece mounted between the movement transmitting element and the connecting element, a carrier element mounted on the connecting element, and a repair element mounted on the carrier element. When the optical disc rotates, in association with a rotation of the repairing device, the scratched surface of the optical disc is polished until a surface without defects is obtained to proper reflection of the laser beam for data access from the optical disc.

9 Claims, 6 Drawing Sheets

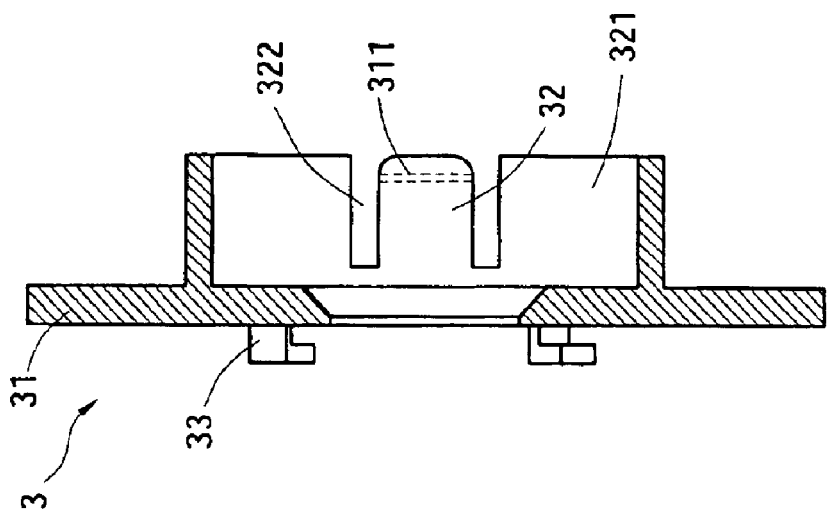
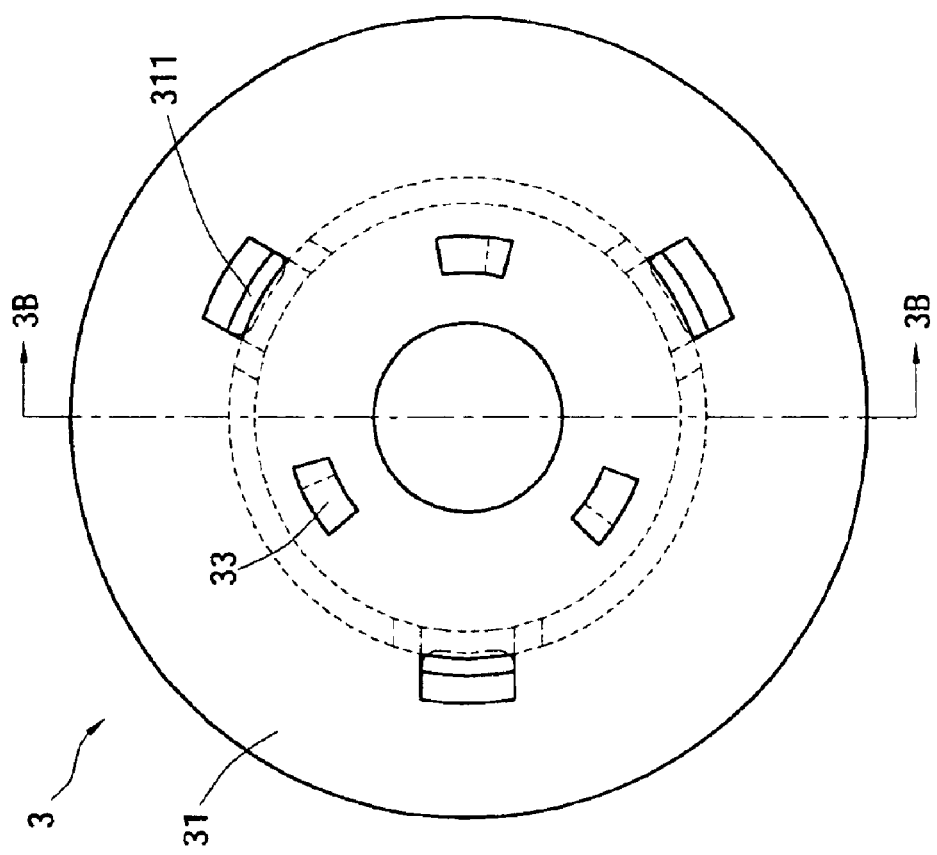

OPTICAL DISC REPAIRING DEVICE

FIELD OF THE INVENTION

The invention relates to an optical disc repairing device, and more particularly to a repairing device that use polishing to repair scratch s damages of an optical disc to obtain proper data access.

BACKGROUND OF THE INVENTION

As information technology advances, the amount of digital information to be stored has greatly increased, resulting in wide utilization of optical discs. However, the optical disc may be inadvertently damaged by scratches in utilization, which may cause loss of data.

Nowadays, the use of optical disc as information storage means has become commonplace and is diversified in different types such as video compact disc read-only-memory (CD-ROM), compact discs (VCD), or digital versatile discs (DVD). If the optical disc is scratched, different kinds of undesired effects may be produced when the optical disc is read, depending upon the types of digital information stored. If the optical disc stores audio data, undesired effects may be sound jumps. If the optical disc stores video data, scratch damages on the optical disc may result in image immobilization or mosaic effects. In the worse cases, the data pickup head may be incapable of accessing the data on the damaged optical disc that then becomes useless. Further, since the material used to fabricate the optical disc is usually not recyclable plastics, the increasing use of optical disc may represent a source of pollution in long term. An ecological solution to this problem would be repairing the damaged optical disc so that it can have a longer service life.

Presently, various types of disc cleaning apparatus may be found on the market, but most of them are only capable of cleaning function. Some commercially available products further may be advertised as being able to provide repairing function of the damaged optical disc, but they actually fill the scratches on the optical disc with wax material. A disadvantage of this solution is that if the liquid wax is not properly disposed, it may cause further scratch damages after solidification. Therefore, an effective solution to disc repairing is still subject to research and development in the present state of the art.

In the fabrication process of an optical disc, a disc substrate after having undergoing processing steps of dye coating then usually has to be provided with a metallic film thereon (usually gold, silver, or copper) to allow an adequate reflection of the laser beam with a proper intensity. The metallic film is typically formed and adhered on the dye recording layer via vacuum spraying or sputtering. A UV-cured resin then is used as protective layer.

U.S. Pat. No. 6,386,946, filed by the same inventor of the present application, discloses an optical disc repair machine suitable for performing cleaning, maintenance, and repair of an optical disc. In this known machine, the damaged disc to be repaired by grinding is put in place on a disc turntable. A grinding wheel is mounted on a grinding arm, and during grinding on the optical disc is supplied with a grinding agent. When the repair machine is turned on, the disc turntable is driven in rotation and the grinding wheel is applied against the optical disc to undergo grinding. The grinding wheel and agent may be of different types to satisfy different levels of grinding, e.g. coarse level, medium level, and fine level. The fine level particularly is dedicated to disc polishing. The damaged optical disc thereby can be progressively ground, polished and rectified until a desired flat surface without defect is obtained.

Although the above repair machine has convenient functions of grinding, polishing and rectifying the optical disc, the size of its structure however is large and its construction is relatively complex. Practical implementation of such a repair machine therefore remains problematic for the disc manufacturer, as well as the entertainment producing company or the music/movie renting shop. It is even less practical for the ordinary terminal consumer who demands for miniaturized, portable and convenient systems.

SUMMARY OF THE INVENTION

It is therefore an object of the invention to provide an optical disc repairing apparatus that can clean, maintain, and repair the optical disc by providing the functions of polishing and rectifying the damaged optical disc until a desired flat surface without defect is obtained.

It is another object of the invention to provide an optical disc repairing apparatus that has a reduced size, is portable and easily stored up, allowing the user to conveniently place in position a damage optical disc and performing polishing and rectifying operations to repair the surface defects of the optical disc.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 3A is a top view of a connecting element according to an embodiment of the invention;

FIG. 3B is a sectional view of the connecting element of FIG. 3A taken along section 3B—3B;

DETAILED DESCRIPTION OF THE EMBODIMENTS

Figure 1:
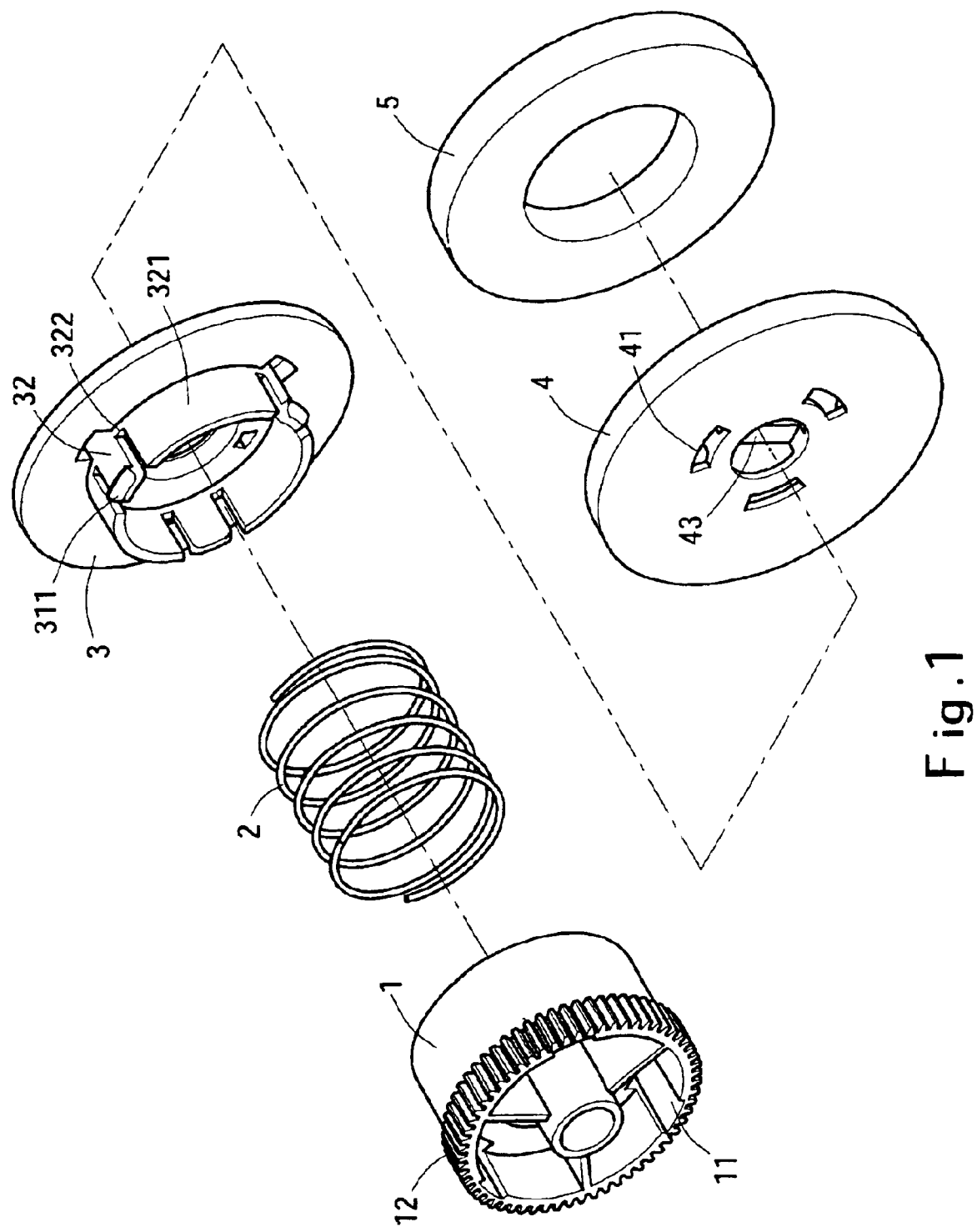
FIG. 1 is an exploded view of an embodiment of the invention.

Wherever possible in the following description, like reference numerals will refer to like elements and parts unless otherwise illustrated.

FIG. 1 is an exploded view of an optical disc repairing device according to an embodiment of the invention, which may be particularly suitable for use in disc cleaning, disc maintenance and disc repair. The optical disc repairing device includes a movement transmitting element 1, a connecting element 3 mounted on the movement transmitting element 1, a resilient element 2 placed between the movement transmitting element 1 and the connecting element 3, a carrier element 4 mounted on the connecting element 3, and a repair element 5 mounted on the carrier element 4.

Figure 2B:
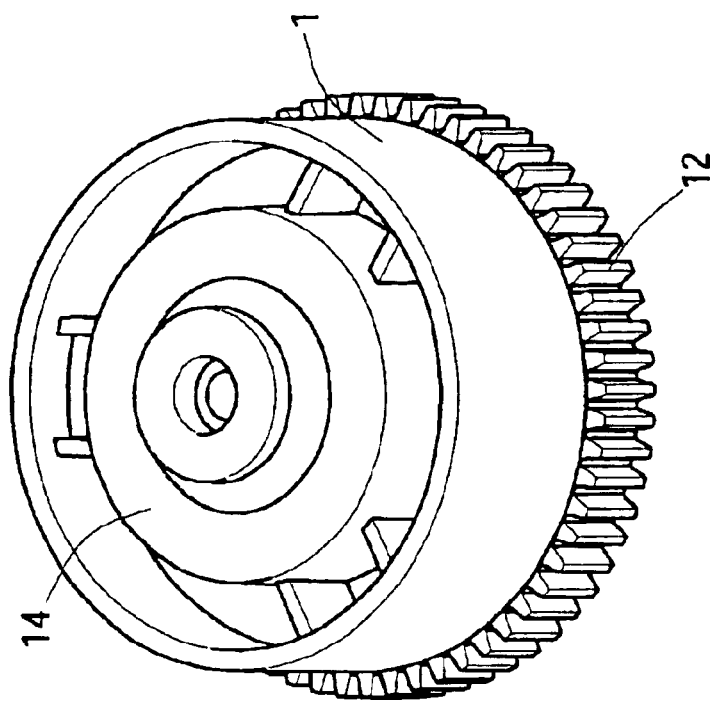
FIG. 2B is a perspective view of the movement transmitting element according to an embodiment of the invention taken under another angle of view.
Figure 2A:
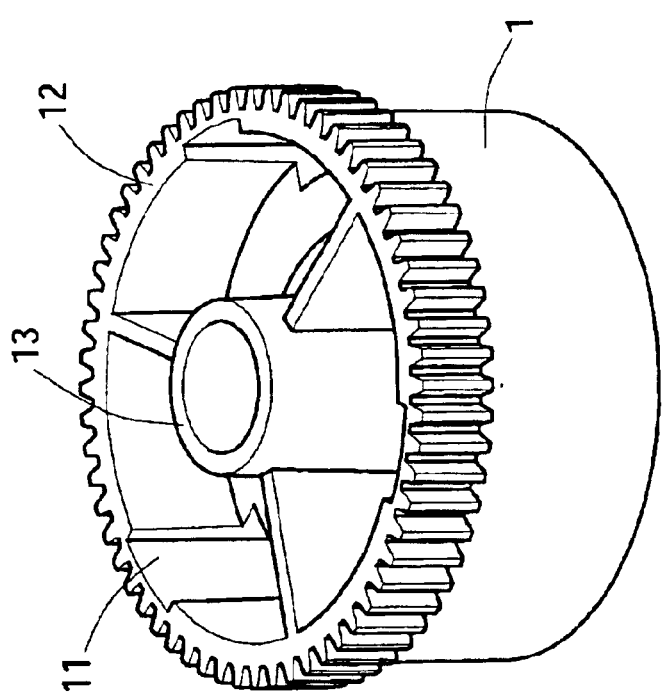
FIG. 2A is a perspective view of a movement transmitting element according to an embodiment of the invention.

FIG. 2A and FIG. 2B are exterior perspective views of the movement transmitting element according to an embodiment of the invention. As shown, the movement transmitting element 1 has an approximately tubular shape at an opening end of which the interior edge is locally recessed to form fitting slots 11. The exterior edge of the aforementioned opening end further forms a toothed driving part 12. The movement transmitting element 1 is centrally provided with a centrally hollow assembling part 13 at an axially opposite end of which a receiving part 14 axially protrudes.

FIG. 3A is a top view of the connecting element 3, and FIG. 3B is a sectional view taken along section 3B—3B in FIG. 3A. As shown, the connecting element 3 has a cover plate 31 at a first side of which an assembling sleeve 321 projects corresponding to the fitting slots 11 of the movement transmitting element 1. At adequate locations of the assembling sleeve 321 are formed notches 322 between which are thereby defined resilient snapping claws 32, a terminal end of each snapping claw 32 forming a lip 311. At a second side of the cover plate 31 opposite its first side are formed fastener pieces 33.

Figure 4B:
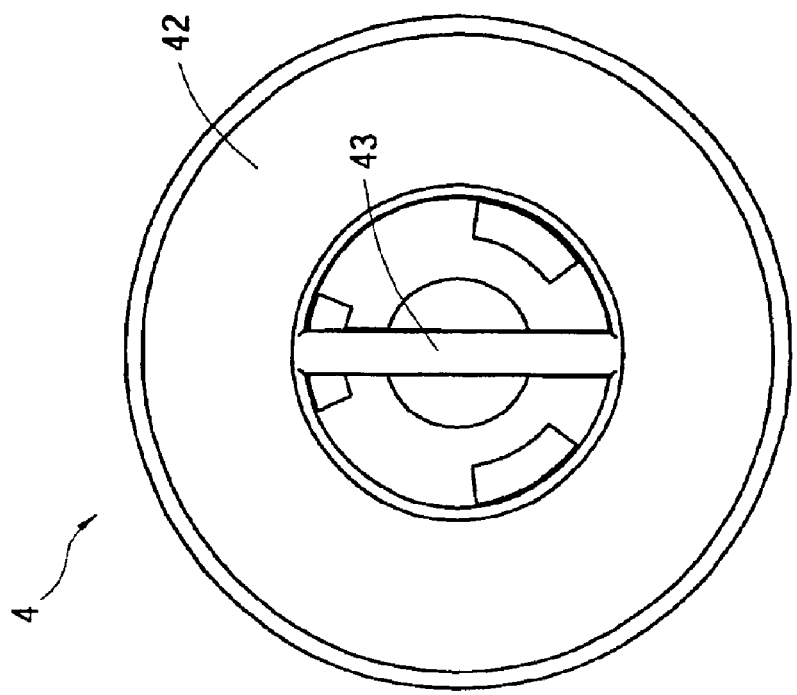
FIG. 4B is a bottom view of the carrier element according to an embodiment of the invention.
Figure 4A:
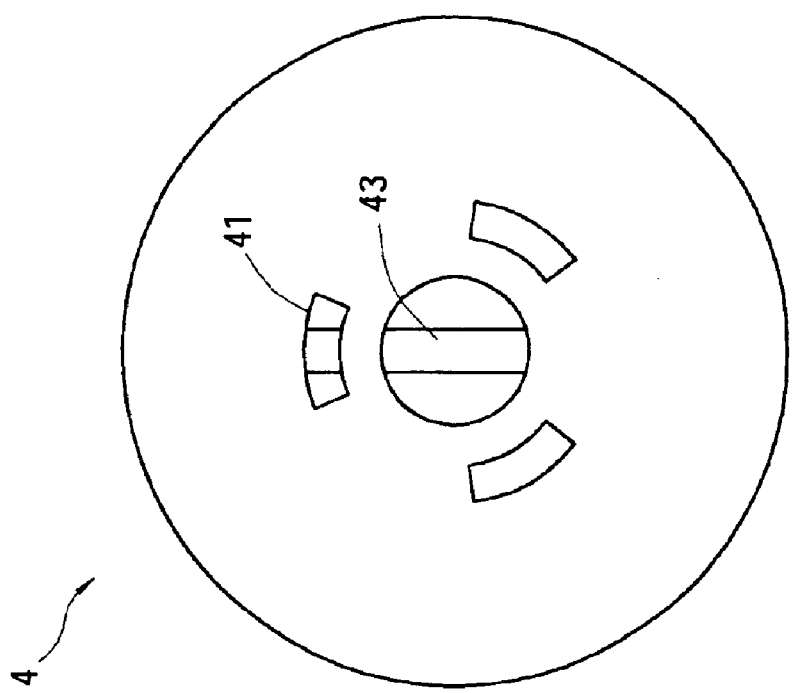
FIG. 4A is a top view of a carrier element according to an embodiment of the invention.

FIG. 4A and FIG. 4B are respectively top view and bottom view of the carrier element 4 according to an embodiment of the invention. A first side of the carrier element 4 is provided with fitting slits 41 distributed at locations respectively corresponding to the snapping claws 32. A second side of the carrier element 4 opposite its first side defines a receptacle 42 capable of receiving different types of repair element 5 (shown in FIG. 1). Within the boundary of the receptacle 5 is further formed an operating portion 43 enabling the user to conveniently perform mounting or dismounting operations of different repair elements 5 (as shown in FIG. 1).

Figure 5B:
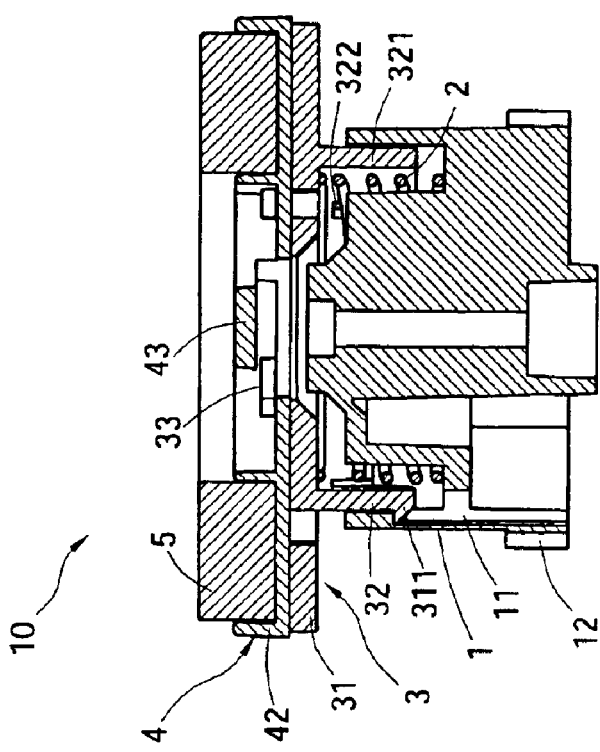
FIG. 5B is a sectional view of FIG. 5A taken along section 5B—5B.
Figure 5A:
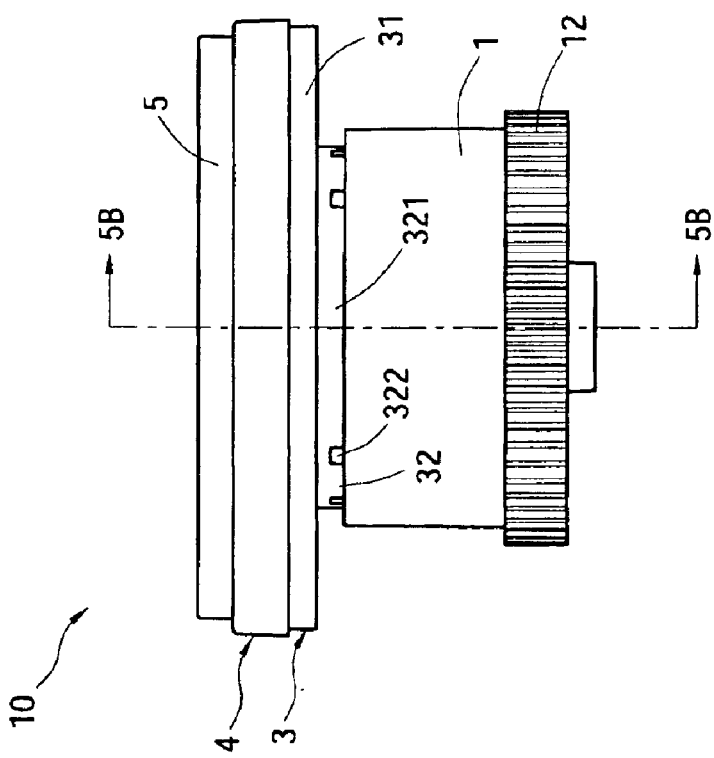
FIG. 5A is a side view of an assembled embodiment of the invention.

FIG. 5A is a side view illustrating a completed assembly of an embodiment of the invention, and FIG. 5B is a sectional view of FIG. 5A taken along section 5B—5B. In assembling the optical disc repairing device of the invention, the resilient element 2 first is mounted on the carrier part 14 of the movement transmitting element 1. The assembling sleeve 321 of the connecting element 3 then is fitted over the movement transmitting element 1. In particular, the snapping claws 32 of the assembling sleeve 321 are inserted inside the fitting slots 11. By means of resilient force the snapping claws 32 outwardly push until their respective lips 311 reach an abutment edge within the fitting slots 11 and thereby release the resilient force, which achieves fastening. Via the resilience of the resilient piece 2, the connecting element 3 can be urged upward. The carrier element 4 then is mounted on the cover plate 31 with the fitting slits 41 positioned on the other ends of the claws 32. Lastly, the repair element 5 is placed inside the receptacle 42 of the carrier element 4, which completes the assembly of the invention. As described, the assembly of the invention therefore can be easily achieved.

Figure 6:
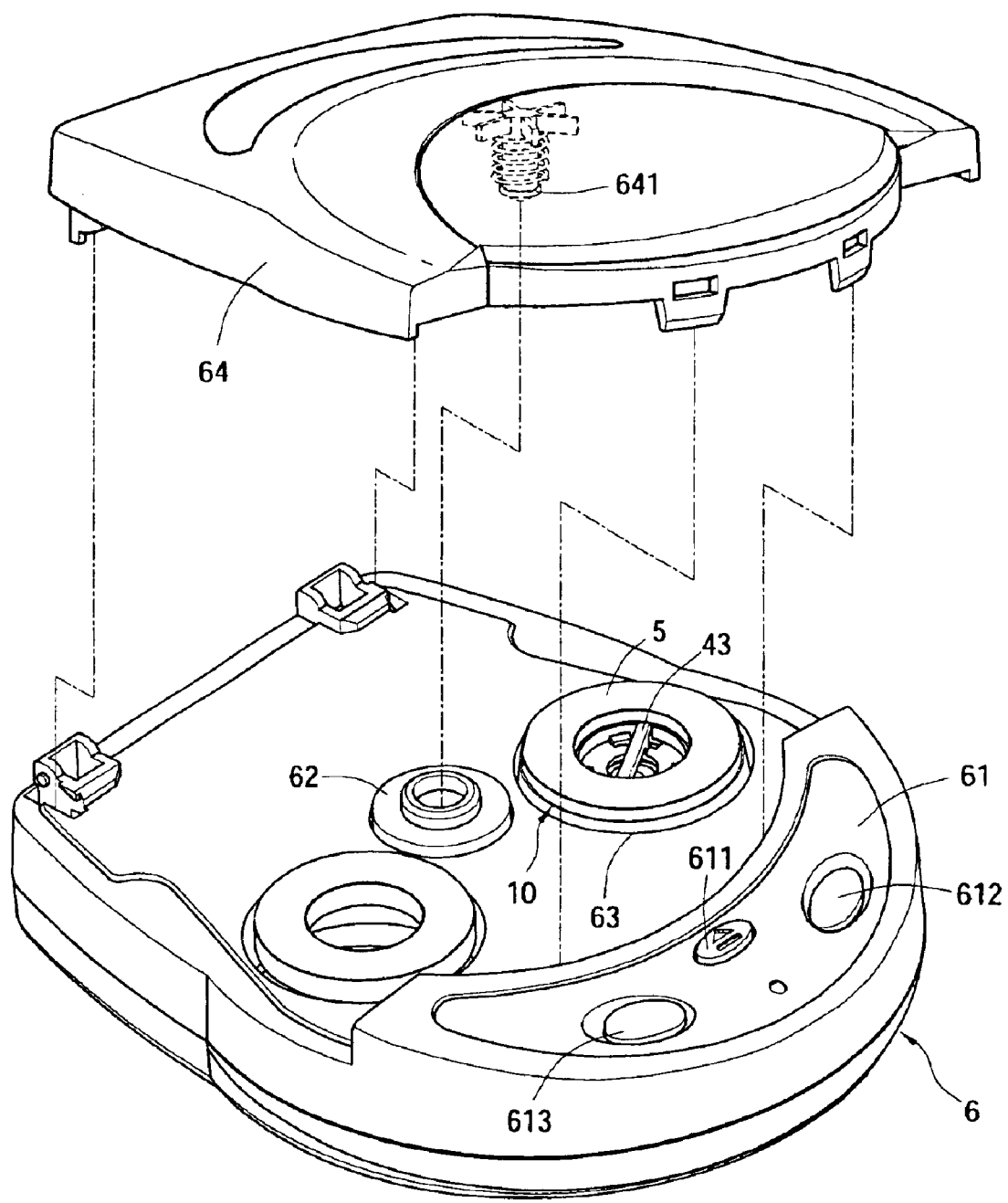
FIG. 6 is a schematic view of the application of an embodiment of the invention.

FIG. 6 is a perspective view illustrating an application of an embodiment of the invention. As shown, an optical disc repairing device according to an embodiment of the invention is arranged on a repairing machine base 6, including a control panel 61. A loading plate 62 receiving the placement of an optical disc is mounted on the base 6 in a manner to be driven in rotation by an inner driving mechanism. At a periphery of the loading plate 62 is formed a mounting part 63 dedicated to the assembly of the optical disc repairing device 10 for driving this latter in movement. The control panel 61 respectively includes a power switch 611 used to power on or power off the power supply, a repair switch 612 used to actuate or stop the repair element 5 arranged on the repairing device 10, and a cleaning switch 613 used to actuate or stop disc cleaning performed on the base 6.

Once the optical disc has been placed in position on the loading plate 62, the power switch 611 is used to activate the base 6 to select the repair switch 612, which thereby activates the repairing device 10 that rotates and performs polishing and repairing operations. The scratches of the optical disc thereby are polished to form a flattened surface. By removal of the scratches, the laser beam used for data access on the optical disc therefore does not undesirably reflect, and optimal data access is thereby accomplished.

To adapt to different degrees of scratching damages on the optical disc, the repair element 5 may be typically divided into different categories of polishing wheel corresponding to different levels of polishing, such as coarse polishing wheel, fine polishing wheel, and rectifying wheel, used in association of different polishing agents.

As described above, the optical disc repairing device 10 of the invention when arranged in a repairing machine base 6 can be easily portable and is convenient to store up. When needed, the user thereby can easily use the embodiment of the invention to polish and rectify the damaged the optical disc to obtain a disc flat and smooth disc surface without defects. The laser beam radiating on the disc surface therefore can properly reflects to access the data stored on the optical disc. In addition, the embodiment of the invention has a cleaning function, and enables to have a longer service life and reduce environmental pollution. A cover 64 may be further mounted on the base 6, the cover 64 having a resilient abutting part 641 at a location corresponding to the loading plate 62. By abutment of the abutting part 641 against the optical disc on the loading plate 62 (not shown), the optical disc thereby can rapidly rotate during polishing in a stable position.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An optical disc repairing device, suitable for repairing an optical disc, the repairing device comprising:

a movement transmitting element;

a connecting element, mounted on the movement transmitting element;

a resilient piece, mounted between the movement transmitting element and the connecting element, the connecting element being urged by the resilient piece upward toward the optical disc;

a carrier element, mounted on the connecting element; and a repair element, mounted on the carrier element, for polishing and rectifying the optical disc, the repairing device being rotatable to publish and rectify a scratched surface of the optical disc by the repair element until the scratch is removed and a flat surface is obtained.

2. The device of claim 1, wherein the movement transmitting element has a tubular shape at an opening end of the movement transmitting element, the interior edge of the opening end being partially recessed to form fitting slots, the exterior edge of the opening end forming a spline part, and the movement transmitting element including a hollow assembling part and a receiving part aligned along a longitudinal axis of the movement transmitting element, the receiving part being at an opposite end to the opening end for receiving the connecting element.

3. The device of claim 1, wherein the connecting element has a cover plate, at a first side of the cover plate the cover plate having an assembling sleeve and a plurality of resilient snapping claws for being inserted into the fitting slots of the movement transmitting element, a lip being at a terminal end of each of the plurality of snapping claws, the plurality of snapping claws being pushed by a resilient force of the resilient piece upward toward the optical disc, the lip of each of the plurality of snapping claws being stopped by an edge of at an end of each of the fitting slots, and a plurality of fastener pieces being at a second side of the cover plate opposite the first side of the cover plate.

4. The device of claim 1, wherein a first side of the carrier element is provided with fitting slits distributed at locations respectively corresponding to the snapping claws, a second side of the carrier element opposite the first side of the carrier element being a receptacle capable of receiving different the repair element, and an operating portion being within the boundary of the receptacle for mounting or dismounting the repair element.

5. The device of claim 1, wherein the repair element includes at least one of a coarse polishing wheel, a fine polishing wheel, and a rectifying wheel.

6. The device of claim 1, wherein the repair element is used with a polishing agent during repairing the optical disc.

7. The device of claim 1, wherein the repairing device is installed on a repairing machine base that includes a control panel, a loading plate carrying the optical disc, and a mounting part at a periphery of the loading plate dedicated to the assembly to drive in movement the repairing device.

8. The device of claim 7, wherein a cover is further mounted on the repairing machine base, the cover having a resilient abutting part at a location corresponding to the loading plate.

9. The device of claim 7, wherein the control panel includes a power switch, a repair switch, and a cleaning switch.

* * * * *